(12) United States Patent
Suganuma

(10) Patent No.: US 7,103,122 B2
(45) Date of Patent: Sep. 5, 2006

(54) NOISE CANCELLER

(75) Inventor: Hisashi Suganuma, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 770 days.

(21) Appl. No.: 10/200,142

(22) Filed: Jul. 23, 2002

(65) Prior Publication Data

US 2003/0039327 A1   Feb. 27, 2003

(30) Foreign Application Priority Data

Aug. 23, 2001 (JP) .............................. 2001-253354
Aug. 27, 2001 (JP) .............................. 2001-256588

(51) Int. Cl.
*H04B 1/10* (2006.01)
*H04M 11/00* (2006.01)

(52) U.S. Cl. .................. 375/350; 375/346; 379/406.01

(58) Field of Classification Search ................ 375/148, 375/284, 285, 278, 342, 346, 349, 350, 232, 375/254, 296; 708/301, 322, 323, 490, 505; 381/13, 94.1; 370/286, 289, 291; 379/406.01, 379/406.04, 406.05, 406.08, 406.15, 406.16, 379/388.01, 388.05, 388.06, 388.07, 390.02, 379/390.04, 392, 392.01, 398
See application file for complete search history.

(56) References Cited

U.S. PATENT DOCUMENTS 4,574,390 A    3/1986    Hirohashi et al.
5,311,087 A *  5/1994    Suganuma .................... 327/94
5,535,280 A *  7/1996    Chahabadi et al. ........... 381/13
5,895,479 A *  4/1999    Suganuma .................. 708/301
6,438,163 B1 * 8/2002    Raghavan et al. .......... 375/233
6,690,805 B1 * 2/2004    Tsuji et al. ................. 381/94.1

FOREIGN PATENT DOCUMENTS

EP        0 477 460 A2     4/1992
JP        A 5-22079        1/1993

* cited by examiner

*Primary Examiner*—Mohammed Ghayour
*Assistant Examiner*—Sam K. Ahn
(74) *Attorney, Agent, or Firm*—Young & Thompson (57) ABSTRACT

A noise canceller for removing noise components from an input signal includes a noise detector which detects a noise component of the input signal and outputs a hold signal which corresponds to duration of the noise component, a first hold circuit which outputs a sample value while holding the input signal during the duration of the noise component, an adder which adds a compensating signal to the sample value, a prediction filter which determines predicted values by performing filter operations on the outputs from the adder, a second hold circuit which outputs a predicted hold value while holding the predicted value during the duration of the noise component, a subtractor which subtracts the predicted hold value from the predicted value and outputs a result as the compensating signal, and a switch which supplies the compensating signal to the adder.

11 Claims, 8 Drawing Sheets

NOISE CANCELLER

BACKGROUND OF THE INVENTION

1. Field of the Invention

The present invention relates to a noise canceller which removes noise components from input signals. More particularly, it relates to a noise canceller which suppresses noise components in an input signal from an FM tuner or the like by predicting the value of the current digital signal based on past values.

2. Description of the Related Art

Recently, FM tuners which receive and demodulate FM broadcast waves have often been used aboard movable bodies. For example, car-mounted FM tuners are more susceptible to external pulse noise such as ignition noise produced by vehicles than typical FM tuners are. Therefore, in order to prevent degradation of sound quality caused by external noise, it is desirable that car-mounted FM tuners should be equipped with a noise canceller which removes noise components due to external noise, from detected signals.

To remove noise components from received FM signals, a commonly used configuration involves detecting noise components contained in detected signals or the like when the received FM signals are processed and holding the received FM signals during the duration of the noise components. Even if noise components are produced during reception of the FM signals, since this configuration holds the FM signals at the level at which they are at the start of noise generation and releases the hold when the noise subsides, it can reduce the effect of noise on the detected signals or the like sent out to downstream circuits.

Regarding a digital prediction filter for a noise canceller, Japanese Patent Laid-Open No. 5-22079, for example, discloses a configuration in which predicted values represented by a predictive equation are calculated by means of delay elements connected in multiple stages and a coefficient multiplier.

However, with a first noise canceller configured in the manner described above, received FM signals are held during periods in which noise components are generated during receiving FM waves, and thus sound signal components are removed together with noise components. For example, if external pulse noise such as ignition noise is generated during FM reception on a car-mounted FM tuner, sound signal components which correspond to a period equivalent to the pulse width of the external noise will be lost. This will deteriorate a distortion factor of the sound signal outputted after demodulation.

Also, FM signals received on an FM tuner generally consist of main signals such as the sound signal superimposed with various signals including a pilot signal for stereophonic broadcasting. For example, looking at a frequency distribution of detected signals, in addition to a 19-kHz pilot signal, various signals including a 38-kHz subcarrier are superimposed at integral multiples of 19 kHz in the frequency band up to 100 kHz. Therefore, digital FM tuners need to process various digital signals at a sufficiently high sampling frequency of at least 200 kHz or higher. Also, they are configured to supply the prediction filter described above with clock signals which correspond to the sampling frequency. Consequently, each of the delay elements which compose the prediction filter operates with a short delay time on the order of several microseconds. Thus, prediction time is on the order of several microseconds.

However, signal compensation based on predicted values produced by a prediction filter is not suited to deal with the above-mentioned ignition noise, which generally has a relatively large pulse width on the order of 50 microseconds.

Figure 8:
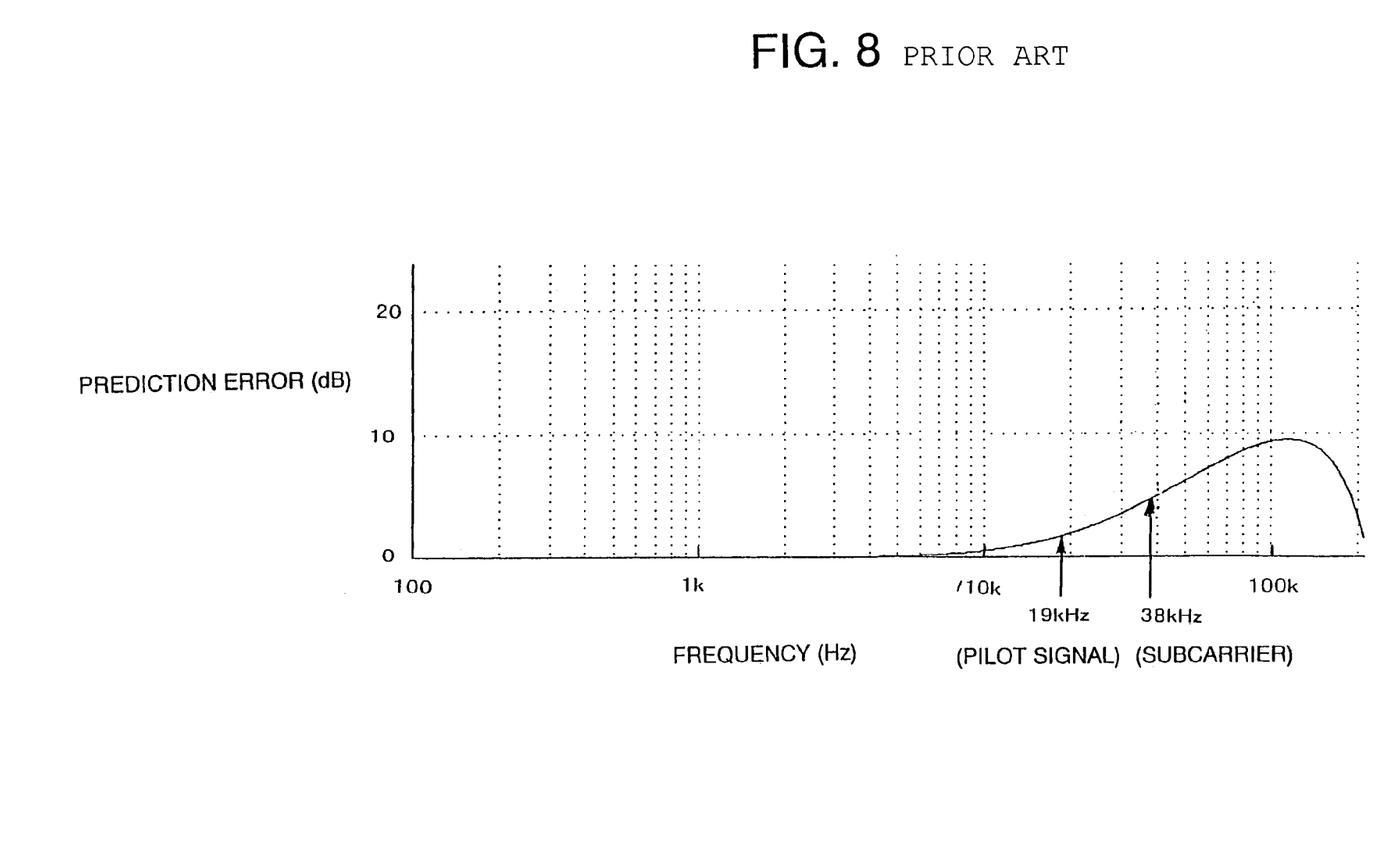
FIG. 8 is a diagram showing a frequency characteristic of a conventional prediction filter.

Furthermore, if the prediction filter is configured to cover a frequency band up to 100 kHz to accommodate an FM tuner, errors are small at low frequencies, but increase sharply at high frequencies. FIG. 8 shows a frequency characteristic of a prediction filter when a linear predictive equation and a sampling frequency of 228 kHz are used. As shown in FIG. 8, prediction error is large around 19 kHz, which is the frequency of the pilot signal, and increases even more at integral multiples of 19 kHz. Consequently, when using a prediction filter in an FM tuner to remove noise, degradation in prediction accuracy for important signals such as the pilot signal and subcarrier becomes a problem.

The present invention has been achieved in view of the above problems. A first object of the present invention is to provide a noise canceller which can remove noise components due to external pulse noise introduced into the input signal while keeping original sound signal components intact, and thereby maintain good sound quality.

A second object of the present invention is to provide a noise canceller with an uncomplicated configuration which can determine predicted values with a high accuracy, even if external noise with a relatively large pulse width is introduced, and maintain high prediction accuracy when main signals are superimposed with various signals.

SUMMARY OF THE INVENTION

The above object of the present invention can be achieved by a noise canceller which removes noise components included in an input signal, provided with: a noise detecting device (11) which detects a noise component contained in said input signal and determines duration of said noise component; a first holding device (12) which passes said input signal in normal times and holds said input signal during the duration of said noise component; a compensating device (13) which outputs said held input signal by adding a compensating signal to compensate for any portion lost during the duration of said noise component; a prediction filter (14) which determines predicted values of said input signal one after another by performing operations on an output signal of said compensating device (13) and outputs the predicted values as a predicted signal (<y1>); a second holding device (15) which holds said predicted signal (<y1>) and generates a predicted hold signal (<yh>) during the duration of said noise component; and a compensating signal generation device (16) which generates said compensating signal by subtracting said predicted hold signal (<yh>) from said predicted signal (<y1>).

This invention detects a noise component contained in an input signal to a noise canceller and determines its duration. Then, it makes a prediction filter predict the input signal by performing operations while the input signal is held during the duration of the noise component. On the other hand, it generates a predicted hold signal by holding the predicted signal during the duration of the noise component and generates a compensating signal by subtracting the predicted hold signal from the predicted signal. By outputting the compensating signal together with the held input signal, it is possible to recover any lost portion of the input signal as well as to remove noise during the duration of the noise component. Therefore, this invention can recover the portion of the input signal lost during the removal of the noise component by using the predicted signal and maintain good sound quality without deteriorating the distortion factor of a sound signal or the like.

The above object of the present invention can be achieved by a noise canceller which removes noise components included in an input signal, provided with: a noise detecting device (11) which detects a noise component contained in said input signal and determines duration of said noise component; a prediction filter (14) which performs operations on sample values of said input signal, determines predicted values of said input signal one after another from the delayed sample values, and outputs the predicted values as a predicted signal (<y1>); and a switching device (17) which performs switching control so as to produce outputs by passing said input signal in normal times and passing said predicted signal (<y1>) during the duration of said noise component.

This invention detects a noise component contained in an input signal to a noise canceller and determines its duration. Then, it makes a prediction filter predict the input signal by performing operations while the input signal is held during the duration of the noise component. On the other hand, it can use the predicted signal instead of the input signal during the duration of the noise component by controlling the path in such a way as to pass the input signal in normal times, and the predicted signal during the duration of the noise component. Therefore, this invention can recover the portion of the input signal lost during the removal of the noise component by using the predicted signal and improve the distortion factor of a sound signal or the like with a simple configuration.

In one aspect of the noise canceller of the present invention, said prediction filter is provided with: a cascade of delay elements (101 to 124) for holding a plurality of sample values sampled at a sampling frequency which is n times (n is an integer equal to or larger than 2) the frequency of a pilot signal contained in said input signal and has a bandwidth two or more times that of said input signal; and an arithmetic device (125 to 127) which produces predicted values of said input signal based on output from m delay elements (m is an integer equal to or larger than 2) out of said cascade of delay elements which correspond to integral multiples of the cycle of said pilot signal counting from the input of said prediction filter.

In addition to performing the above actions, this invention inputs sample values in the prediction filter, holds them one after another in each stage of cascaded delay elements by delaying them by a sampling interval. Then, it sets a sampling frequency at n times the frequency of a pilot signal and determines predicted values of the input signal based on m delay elements—out of the cascade of delay elements—which correspond to integral multiples of the cycle of the pilot signal. Since the noise canceller removes noise by using the predicted values thus obtained, it can remove noise component with a large pulse width precisely, even if the sampling interval is short, and maintain high prediction accuracy for the pilot signal or the like.

In another aspect of the noise canceller of the present invention, said prediction filter is provided with: a cascade of delay elements (101 to 124) for holding a plurality of sample values sampled at a sampling frequency which is n times (n is an integer equal to or larger than 2) the frequency of a pilot signal contained in said input signal and has a bandwidth two or more times that of said input signal; and an arithmetic device (125 to 127) which produces predicted values of said input signal based on output from one delay element out of said cascade of delay elements which corresponds to the cycle of said pilot signal counting from the input of said prediction filter.

Using the cascade of delay elements as mentioned above, this invention can set the sampling frequency at n times the frequency of the pilot signal and determine predicted values of the input signal based on one delay element—out of the cascade of delay elements—which corresponds to the cycle of the pilot signal. Since the noise canceller removes noise by using the predicted values thus obtained, it can calculate predicted values by using a simple predictive equation of zero order and secure desired prediction accuracy.

In further aspect of the noise canceller of the present invention, said input signal is a received FM signal.

According to this invention, in addition to performing the actions as mentioned above, since the noise canceller used in FM reception is suitably configured to remove pulse noise components, it can remove, for example, ignition noise produced in car-mounted FM tuners precisely.

In further aspect of the noise canceller of the present invention, said sampling frequency is set to 12 times the frequency of said pilot signal.

Since this invention applies the invention as mentioned above to FM reception and sets the sampling frequency to 12 times the frequency of the pilot signal, it can determine predicted values precisely in the presence of external noise and achieve high prediction accuracy around the frequency of the pilot signal and its integral multiples.

In further aspect of the noise canceller of the present invention, said input signal is a received FM signal, said sampling frequency is set to 12 times the frequency of said pilot signal, and the current sample value is predicted based on output from the 12th and 24th delay elements (112, 124) of said prediction filter counting from the input of said prediction filter; and a prediction is made according to a predictive equation $y=ax+b$, where x denotes a past value and y denotes said current sample value.

Since this invention applies the invention as mentioned above to FM reception, sets the sampling frequency to 12 times the frequency of the pilot signal, and uses a linear predictive equation $y=ax+b$, it can achieve good prediction accuracy with a relatively simple configuration.

In further aspect of the noise canceller of the present invention, said input signal is a received FM signal, said sampling frequency is set to 12 times the frequency of said pilot signal, and the current sample value is predicted based on output from the 12th delay element (112) of said prediction filter counting from the input of said prediction filter; and a prediction is made according to a predictive equation $y=x$, where x denotes a past value and y denotes said current sample value.

Since this invention applies the invention as mentioned above to FM reception, sets the sampling frequency to 12 times the frequency of the pilot signal, and uses a zero-order predictive equation $y=x$, it can determine predicted values as desired after adequately deleting components used for operations.

The above object of the present invention can be achieved by a noise canceller which removes noise components included in a received signal, and is provided with a prediction filter (14) that obtains a plurality of sample values as a past value by sampling said received signal and predicts the current sample value based on at least one among said plurality of the sampling values, wherein said prediction filter (14) is provided with: a cascade of delay elements (101 to 124) for holding said plurality of sample values sampled at a sampling frequency which is n times (n is an integer equal to or larger than 2) the frequency of a pilot signal contained in said received signal and has a bandwidth two or more times that of said received signal; and an arithmetic device (125 to 127) which produces said current sample value based on output from m delay elements (m is an integer equal to or larger than 2) out of said cascade of delay elements which correspond to integral multiples of the cycle of said pilot signal counting from the input of said prediction filter (14).

This invention inputs sample values in the prediction filter, holds them one after another in each stage of cascaded delay elements by delaying them by a sampling interval. Then, it sets a sampling frequency at n times the frequency of a pilot signal and determines predicted values of the input signal based on m delay elements—out of the cascade of delay elements—which correspond to integral multiples of the cycle of the pilot signal. Since the noise canceller removes noise by using the predicted values thus obtained, it can remove noise component with a large pulse width precisely, even if the sampling interval is short, and maintain high prediction accuracy for the pilot signal or the like.

In one aspect of the noise canceller of the present invention, said received signal is a received FM signal, said sampling frequency is set to 12 times the frequency of said pilot signal, the current sample value is predicted based on output from the 12th and 24th delay elements (112, 124) of said prediction filter (14) counting from the input of said prediction filter (14), and a prediction is made according to a predictive equation $y=ax+b$, where x denotes said past value and y denotes said current sample value.

Since this invention applies the invention as mentioned above to FM reception, sets the sampling frequency to 12 times the frequency of the pilot signal, and uses a linear predictive equation $y=ax+b$, it can achieve good prediction accuracy with a relatively simple configuration.

The above object of the present invention can be achieved by a noise canceller which removes noise components included in a received signal, and is provided with a prediction filter (14) that obtains a plurality of sample values as a past value by sampling said received signal and predicts the current sample value based on at least one among said plurality of the sampling values, wherein said prediction filter (14) is provided with: a cascade of delay elements (101 to 124) for holding said plurality of sample values sampled at a sampling frequency which is n times (n is an integer equal to or larger than 2) the frequency of a pilot signal contained in said received signal and has a bandwidth two or more times that of said received signal; and an arithmetic device (125 to 127) which produces said current sample value based on output from one delay element out of said cascade of delay elements which correspond to integral multiples of the cycle of said pilot signal counting from the input of said prediction filter (14).

This invention can set the sampling frequency at n times the frequency of the pilot signal and determine predicted values of the input signal based on one delay element—out of the cascade of delay elements—which corresponds to the cycle of the pilot signal. Since the noise canceller removes noise by using the predicted values thus obtained, it can calculate predicted values by using a simple predictive equation of zero order and secure desired prediction accuracy.

In one aspect of the noise canceller of the present invention, said received signal is a received FM signal, said sampling frequency is set to 12 times the frequency of said pilot signal, the current sample value is predicted based on output from the 12th delay element (112) of said prediction filter (14) counting from the input of said prediction filter (14), and a prediction is made according to a predictive equation $y=x$, where x denotes said past value and y denotes said current sample value.

Since this invention applies the invention as mentioned above to FM reception, sets the sampling frequency to 12 times the frequency of the pilot signal, and uses a zero-order predictive equation $y=x$, it can determine predicted values as desired after adequately deleting components used for operations.

DETAILED DESCRIPTION OF THE PREFERRED EMBODIMENTS

A preferred embodiment of the present invention will be described below with reference to the drawings. This embodiment concerns a case in which the present invention is applied to a noise canceller for removing external noise in a digital FM tuner which can receive FM broadcasting.

Figure 1:
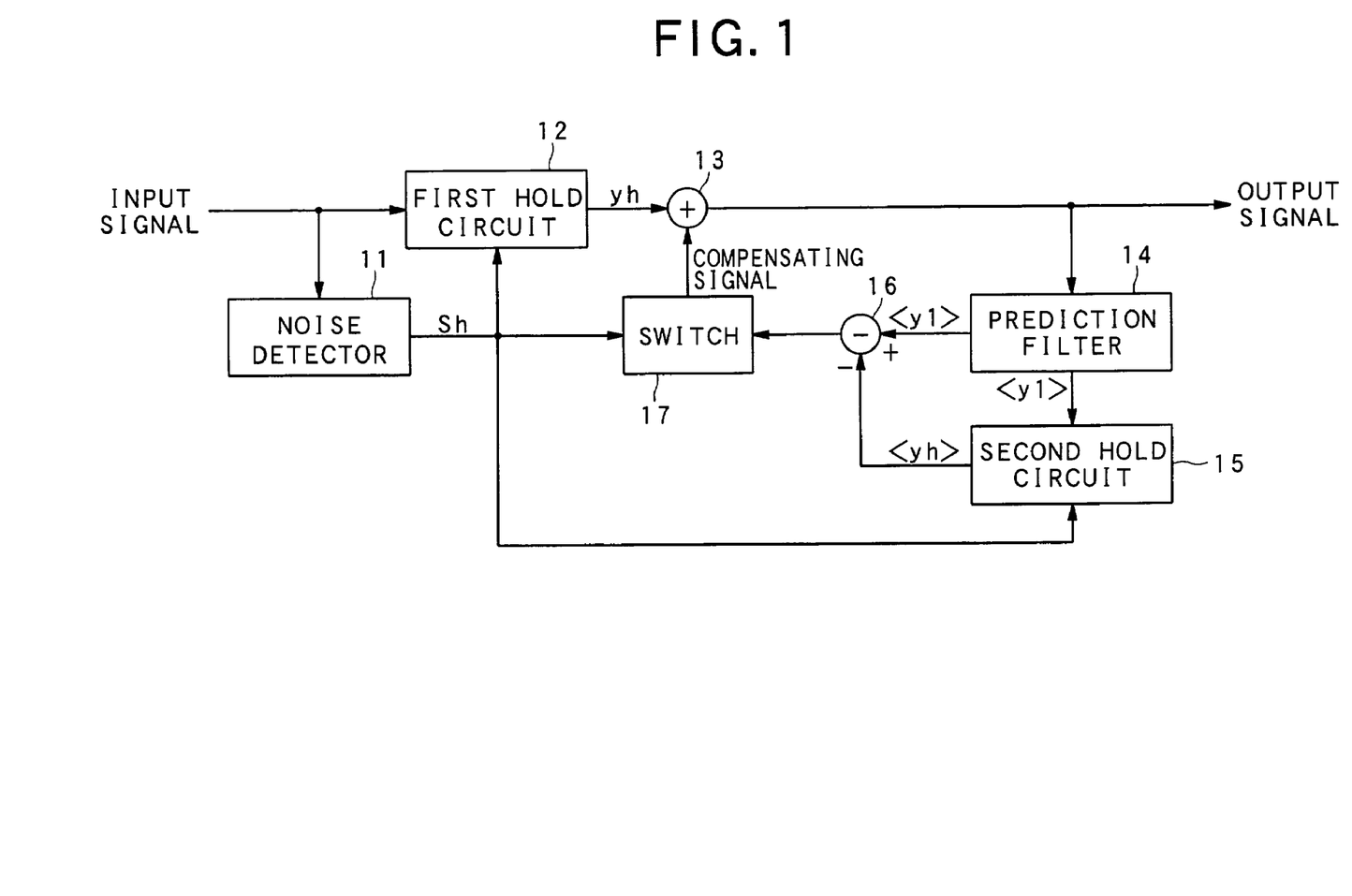
FIG. 1 is a block diagram showing a simplified configuration of a noise canceller according to an embodiment.
Figure 2:
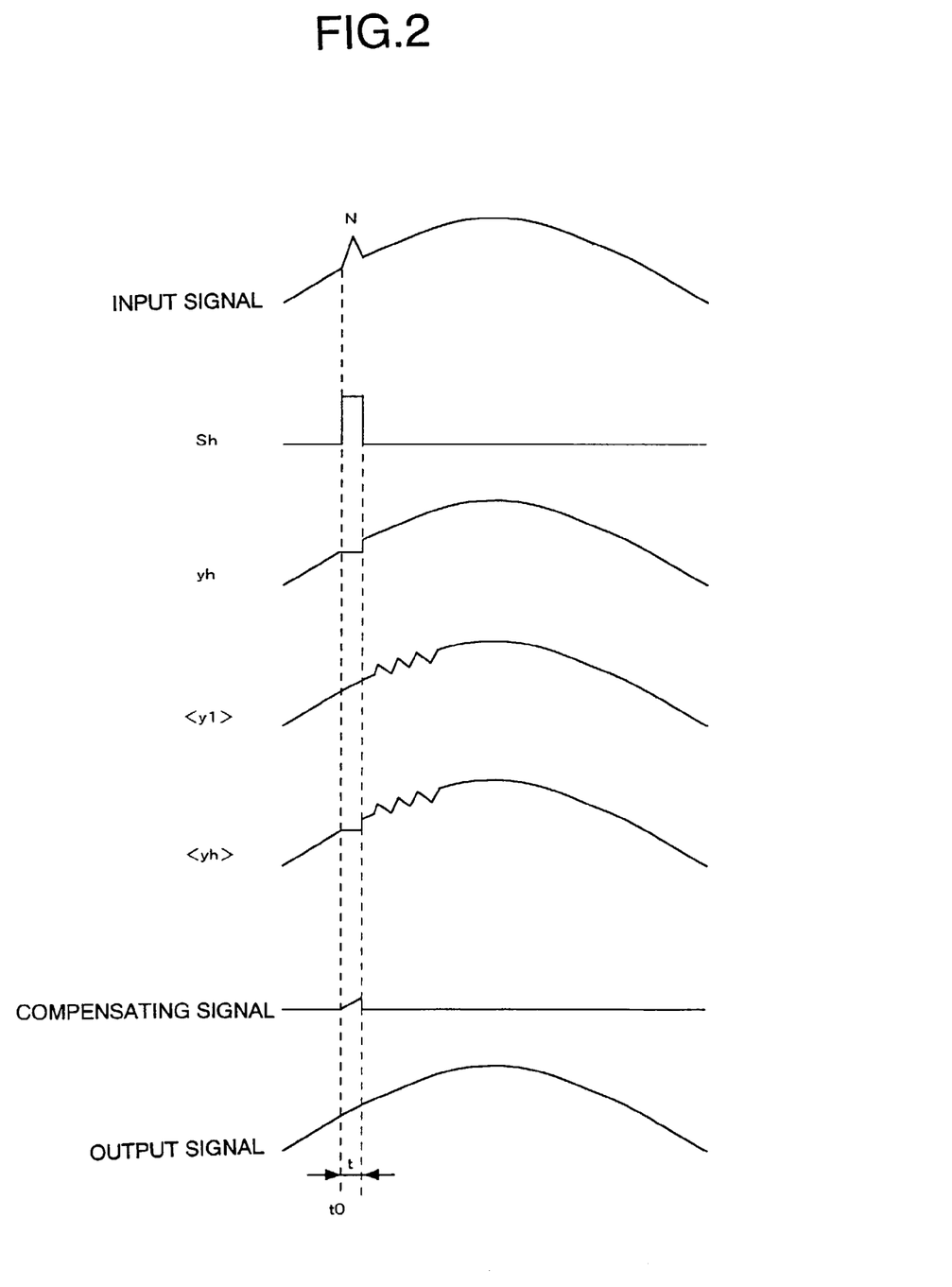
FIG. 2 is a diagram showing an example of signal waveforms produced in various parts of the noise canceller shown in FIG. 1 and affected by external noise.

The configuration and operation of the noise canceller according to this embodiment will be described with reference to FIGS. 1 and 2. The noise canceller described here is intended to remove external noise such as ignition noise contained in received FM signals, for example, in a car-mounted digital FM tuner. FIG. 1 is a block diagram showing a simplified configuration of the noise canceller according to this embodiment. FIG. 2 shows an example of signal waveforms produced in various parts of the noise canceller shown in FIG. 1 and affected by external noise.

As shown in FIG. 1, the noise canceller according to this embodiment comprises a noise detector 11 serving as a noise detecting device, a first hold circuit 12 serving as a first holding device, an adder 13 serving as a compensating device, a prediction filter 14 serving as a prediction filter, a second hold circuit 15 serving as a second holding device, a subtractor 16 serving as a compensating signal generation device, and a switch 17 serving as a switching device. In this configuration, detected signals which correspond to FM broadcasting received by the digital FM tuner are digitized and inputted into the noise canceller. After external noise is removed by the noise canceller, output signals are sent to a downstream audio circuit.

Referring to FIG. 1, the noise detector 11 detects a noise component contained in an input signal to the noise canceller, and outputs a hold signal Sh when noise is present. The noise detector 11 can be configured, for example, to extract high-frequency components of the input signal by means of a high-pass filter, generate a signal with a level corresponding to the noise component by passing the extracted high-frequency components through a rectifier circuit, and compare the level of the generated signal with a predetermined reference level.

As an input signal to the noise canceller, suppose an audio signal whose waveform changes moderately and which is superimposed with external noise N as shown in FIG. 2. With respect to the input signal shown in FIG. 2, the noise detector 11 outputs such a hold signal Sh that will rise from a low level to a high level at a time t0 when external noise appears and will keep the high level for a period equivalent to the pulse width t during the period when the external noise exists.

The first hold circuit 12 obtains a sample value yh of the input signal to the noise canceller by holding the signal level existing when the external noise is detected, based on the hold signal Sh. Specifically, as shown in FIG. 2, the first hold circuit 12 passes the input signal directly as the sample value yh in normal times and holds the signal level existing at the time t0 when the hold signal Sh rises, as the sample value yh until the time t elapses. After the time t elapses, it passes the original input signal directly as the sample value yh again.

The adder 13 adds a compensating signal supplied via the switch 17, to an output signal of the first hold circuit 12, and then outputs the result of the addition to the prediction filter 14 as well as uses it as an output signal to the outside. Specifically, as shown in FIG. 2, the original signal waveform is lost as the output signal from the first hold circuit 12 is held during the existence of the external noise, but the original signal waveform can be restored through addition of the compensating signal. Consequently, the input signal from which the components attributable to the external noise N has been removed generates the output signal. A concrete method for generating the compensating signal will be described later.

The prediction filter 14 is configured as a digital filter which performs filter operations on sample values of the output signal from the adder 13. It serves to determine predicted values $<y1>$ one after another based on delayed past sample values and output them as a predicted signal. The predicted values $<y1>$ produced by the prediction filter 14 are supplied to the second hold circuit 15 and subtractor 16. Actually, the predicted signal based on the predicted values $<y1>$ produced by the prediction filter 14 has a signal waveform such as one shown in FIG. 2, and the concrete configuration and the operation of the prediction filter 14 will be described later.

With respect to the predicted values $<y1>$ determined by the prediction filter 14, the second hold circuit 15 obtains a predicted hold value $<yh>$ by holding the predicted value $<y1>$ existing when the external noise is detected, based on the hold signal Sh. Specifically, as shown in FIG. 2, the second hold circuit 15 passes predicted values $<y1>$ as they are in normal times, and holds the level of the predicted value $<y1>$ existing at the time t0 when the hold signal Sh rises, as the predicted hold value $<yh>$ until the time t elapses. After the time t elapses, it returns to its original state and passes predicted values $<y1>$ as they are.

The subtractor 16 subtracts the predicted hold value $<yh>$ in the second hold circuit 15 from the predicted value $<y1>$ determined by the prediction filter 14 and outputs the result of subtraction as a compensating signal to the switch 17. As shown in FIG. 2, since the predicted hold value $<yh>$ matches the predicted value $<y1>$ in normal times, the output of the subtractor 16 becomes zero. On the other hand, as the second hold circuit 15 enters a hold mode during the existence of the external noise, the subtractor 16 subtracts the predicted hold value $<yh>$ from the predicted value $<y1>$ to subsequently output the value of a change contained in the predicted signal. In this way, the effect of the prediction error produced by the prediction filter 14 is reduced by using the difference between the predicted value $<y1>$ and the predicted hold value $<yh>$.

The switch 17 controls circuit connection by switching between the output of the subtractor 16 and the input of the adder 13 based on the hold signal Sh, so that the compensating signal will be supplied to the adder 13 when external noise is detected by the noise detector 11. Then, the compensating signal having the signal waveform shown in FIG. 2 is added by the adder 13 during the time t when the sample value yh is held. Consequently, the lost portion of the input signal can be compensated for at the time t of the sample value y1, resulting in an output signal having a signal waveform equivalent to the input signal of the noise canceller from which the external noise has been removed.

Next, the configuration of the prediction filter 14 will be described with reference to FIG. 3. As shown in the figure, the prediction filter 14 according to this embodiment comprises 24 delay elements 101 to 124 (indicated by D in the figure) serving as a delay element, coefficient multipliers 125 and 126 serving as an arithmetic device, and a subtractor 127 serving as an arithmetic device. Incidentally, it is assumed that a clock of 228 kHz which corresponds to the sampling frequency is supplied to components of the prediction filter 14 although it is omitted in FIG. 3.

In the above configuration, the sample value y1 as the input signal to the prediction filter 14 is inputted in the first delay element 101. The delay element 101 holds it for a delay of 4.38 microseconds which corresponds to one clock cycle (sampling interval), and then outputs a delayed sample value y0 to the next delay element 102. Similarly, the delay element 102 outputs a sample value y_1 delayed by two clocks. The subsequent delay elements 103 to 124 transmit shifted sample values y_2 to y_23 in sequence and accumulating the delay time. Incidentally, the delay elements 101 to 124 can be built, for example, from D flip-flops.

The 12th delay element 112 of the 24 delay elements 101 to 124 is connected with the coefficient multiplier 125, and a sample value y_11, which is an output signal from the delay element 112, is inputted in the coefficient multiplier 125. In this case, the sample value y_11 is inputted in the coefficient multiplier 125 via 12 delay elements 101 to 112 connected in multiple stages. Thus, the delay time totals to 52.63 microseconds (12×4.38 microseconds), whose reciprocal equals 19 kHz. The coefficient multiplier 125 outputs the inputted sample value y_11 to the subtractor 127 after multiplying it by a predetermined number (wherein, ×2).

The last delay element 124 of the 24 delay elements 101 to 124 is connected with the coefficient multiplier 126, and a sample value y_23, which is an output signal from the delay element 124, is inputted to the coefficient multiplier 126. In this case, the sample value y_23 is inputted to the coefficient multiplier 126 via 24 delay elements 101 to 124 connected in multiple stages. Thus, the delay time, when counted from the position of the coefficient multiplier 125, also totals 52.63 microseconds, whose reciprocal equals 19 kHz. The coefficient multiplier 126 outputs the inputted sample value y_23 to the subtractor 127 after multiplying it by a predetermined number (wherein, ×1).

Thus, the coefficient multipliers 125 and 126 are arranged on the time axis at intervals of 52.63 microseconds from the front of the prediction filter 14. The subtractor 127 subtracts the output value of the coefficient multiplier 126 from the output value of the coefficient multiplier 125, and outputs the result as the predicted value <y1> of the prediction filter 14. The predicted value <y1> produced by the subtractor 127 here is given by the following equation.

$$<y1>=2y\_11-y\_23 \quad (1)$$

In this way, the prediction filter 14 according to this embodiment predicts signal waveforms based on a linear predictive equation given by Equation (1). Incidentally, although two coefficient multipliers 125 and 126 are used in FIG. 3, the number of coefficient multipliers may be increased to make predictions using a higher-order predictive equation. It is also possible to make predictions using a predictive equation of zero order as described later. However, since 12 delay elements must be installed between any two coefficient multipliers as shown in FIG. 2, the higher the order of the predictive equation, the more complex the configuration becomes.

Figure 3:
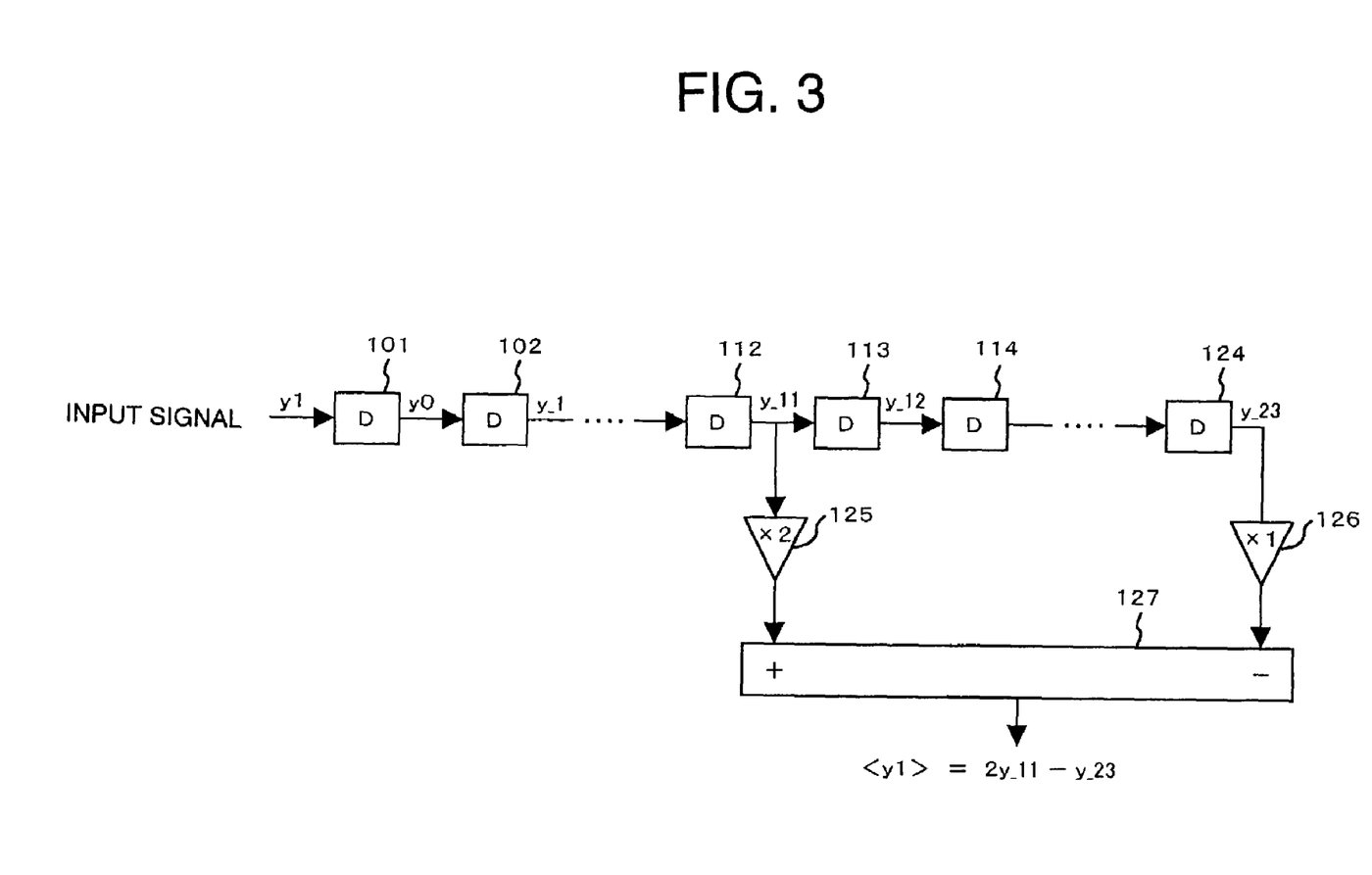
FIG. 3 is a block diagram showing a configuration of a prediction filter.
Figure 4:
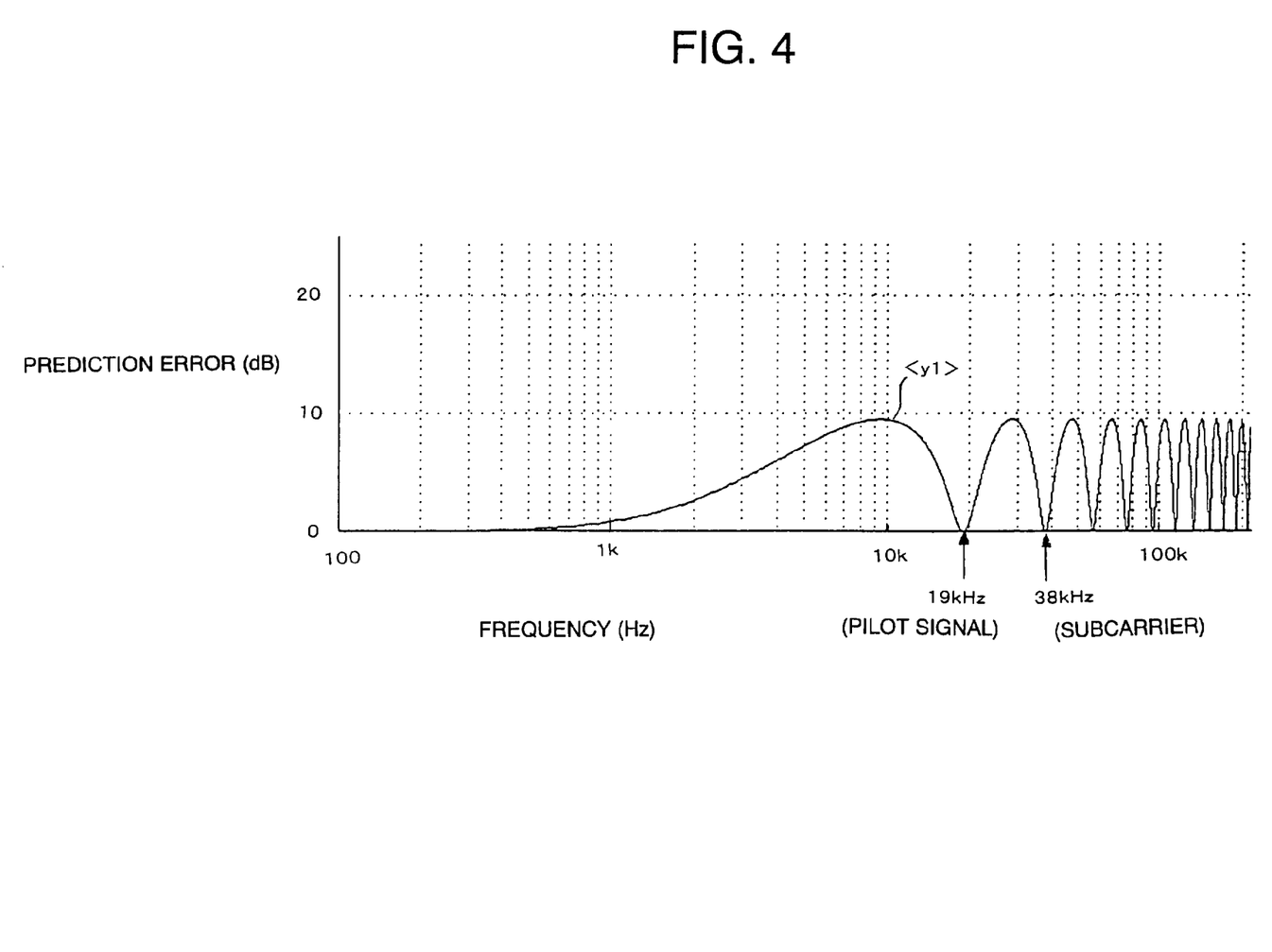
FIG. 4 is a diagram showing a frequency characteristic of the prediction filter.

Next, the characteristics and the operation of the prediction filter 14 configured as shown in FIG. 3 will be described with reference to FIGS. 4 and 5. FIG. 4 is a diagram showing a frequency characteristic of the prediction filter 14. FIG. 4 graphically shows changes in prediction error according to frequencies in an assumed frequency band of detected FM signals. As can be seen from FIG. 4, the closer the frequency characteristic to 0 dB, the smaller the prediction error of the prediction filter 14, resulting in higher prediction accuracy.

As shown in FIG. 4, the prediction error of the prediction filter 14 is small in a low frequency domain where audio signals are distributed, but it gradually becomes large at high frequencies. In a higher frequency domain, the prediction error suddenly becomes 0 dB at 19 kHz, which is the frequency of the pilot signal. It also becomes 0 dB at 38 kHz, which is the frequency of the subcarrier. Subsequently, the prediction error becomes 0 dB at integral multiples of 19 kHz. This is based on general characteristics of digital filters configured so that the reciprocal of the delay time produced by 12 delay elements in the prediction filter 14 will be 19 kHz, as described above. By providing the prediction filter 14 with such frequency characteristics, it is possible to sufficiently reduce prediction error in the pilot signal and subcarrier which play important roles in demodulation when the prediction filter 14 is operated during FM reception.

Figure 5:
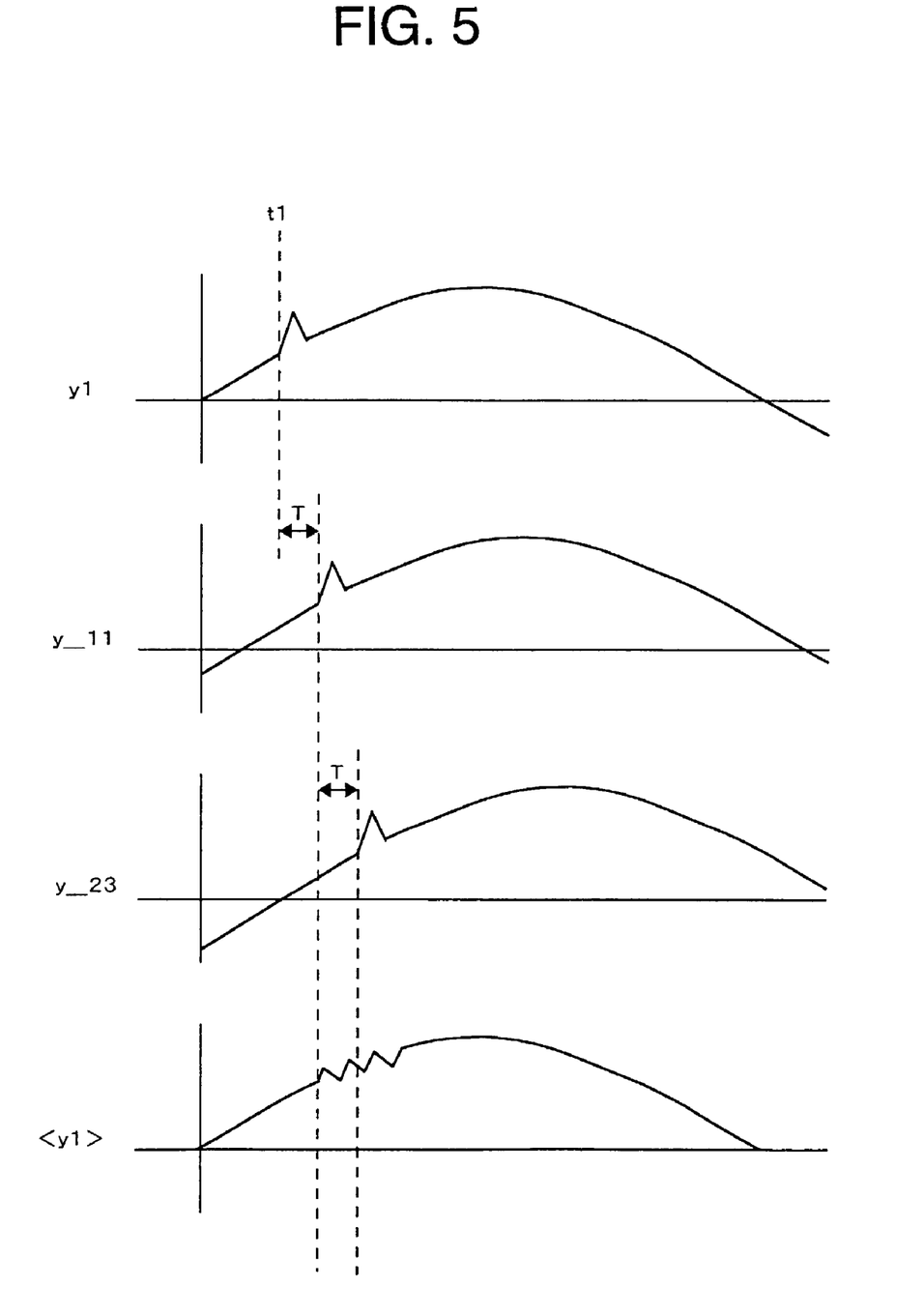
FIG. 5 is a diagram showing an example of signal waveforms produced in various parts of the prediction filter and affected by external pulse noise.

Next, FIG. 5 shows an example of signal waveforms produced in various parts of the prediction filter 14 and affected by external pulse noise. In relation to the prediction filter 14, FIG. 5 compares the signal waveform of the sample value y1 without a delay, the signal waveform of the sample value y_11 in the delay element 112, the signal waveform of the sample value y_23 in the delay element 124, and the signal waveform of the predicted value <y1>in the subtractor 127, on a common time axis. Whereas with the noise canceller shown in FIG. 1, noise has been removed from the sample value inputted in the prediction filter 14, the sample value y1 inputted in the prediction filter 14 here contains noise for purposes of illustration.

In FIG. 4, the input signal to the prediction filter 14 changes in such a pattern as the signal waveform of the sample value y1. It is suddenly superimposed with external pulse noise at time t1, causing the waveform to be disturbed over a given pulse width. For example, ignition noise of a vehicle generally has a pulse width of approximately 30 to 50 microseconds. The signal waveform of the sample value y_11 follows the same pattern as the signal waveform of the sample value y1 with a delay of 12 clocks. Therefore, the external pulse noise described above appears in the signal waveform of the sample value y1 with a delay of T (=52.63 microseconds) from the time t1. Also, the signal waveform of the sample value y_23 follows the same pattern as the signal waveform of the sample value y_11 with a delay of 12 clocks. Thus, the external pulse noise described above appears in the signal waveform of the sample value y1 with a delay of 2T from the time t1.

The predicted value <y1> outputted from the subtractor 127 is obtained by performing operations on two signals—the sample value y_11 and sample value y_23—using Equation (1) described above. The predicted value <y1> is produced by the prediction filter 14 which predicts its input signal using the linear predictive equation. Ideally, it roughly matches the signal waveform of the sample value y1 in FIG. 5. If the external pulse noise appears in the signal waveform, the waveform pattern is disturbed at a different time from the sample value y1. On the other hand, if the external noise appears in the input signal, since the signal waveform of the predicted value <y1> is not disturbed, it is possible to use the predicted value <y1> instead of the original input signal by controlling the switch 17 in such a way as to pass the predicted value <y1> instead of the input signal in a timely manner as described above.

In this way, the use of the predicted value <y1> in time with the appearance of the external noise makes it possible to implement the operation of the noise canceller to remove noise shown in FIG. 1. According to this embodiment, since the delay time T has been set somewhat longer than the pulse width of the assumed external noise, the noise can be removed properly by using the predicted value <y1>. As can be seen from FIG. 5, if the delay time T is short, waveform patterns caused by the external noise on the waveform of the input signal and on the signal waveform of the predicted value <y1> overlap each other in time. Consequently, the noise canceller cannot remove the noise sufficiently. As described above, since the delay time has been set to 52.63 microseconds or 12 clocks, which covers the normal pulse width of ignition noise, noise components can be removed reliably.

Figure 6:
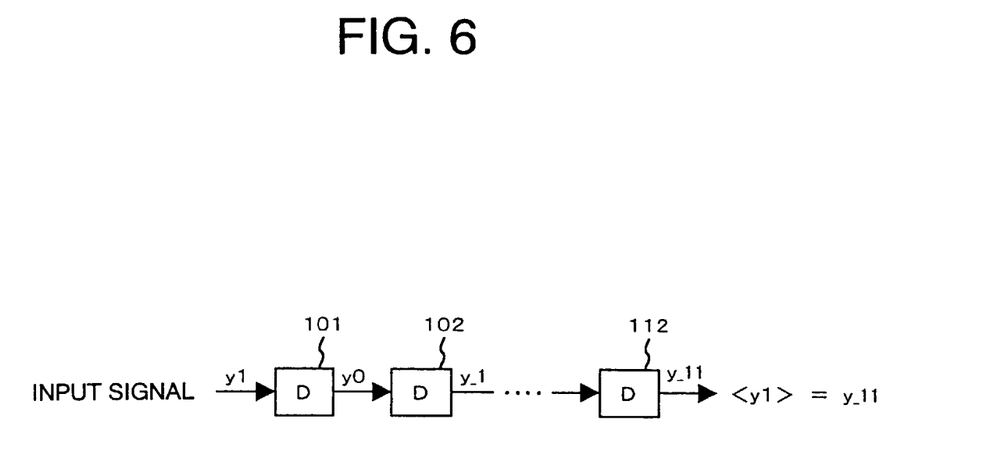
FIG. 6 is a block diagram showing another example of the prediction filter.

Next, another example of the prediction filter 14 will be described with reference to FIG. 6. Whereas the prediction filter 14 in FIG. 3 is configured to be compatible with a linear predictive equation, the prediction filter 14 in FIG. 6 is configured to be compatible with a zero-order predictive equation. As shown in FIG. 6, the prediction filter 14 according to this example consists of 12 delay elements 101 to 112. Incidentally, it is assumed that the delay elements 101 to 112 of the prediction filter 14 are supplied with 228 kHz clocks which correspond to the sampling frequency, as is the case with FIG. 3.

The configuration in FIG. 6 differs from the configuration of FIG. 3 in that it lacks the coefficient multipliers 125 and 126 and the subtractor 127. However, as is the case with FIG. 3, the sample value y1 inputted in the top delay element 101 is transmitted to the subsequent delay elements 102 to 112 in sequence and the sample value y_11 is outputted from the last delay element 112. Then, the sample value y_11 becomes the predicted value <y1> as it is. Thus, the predicted value <y1> is given by the following equation.

$$<y1>=y\_11 \quad (2)$$

In this way, the prediction filter 14 in FIG. 6 predicts signal waveforms based on the zero-order predictive equation given as Equation (2). The configuration of the prediction filter 14 can be simplified using the example in FIG. 6 when there is no need for the prediction accuracy provided by the linear predictive equation in FIG. 3 or a higher-order predictive equation.

Figure 7:
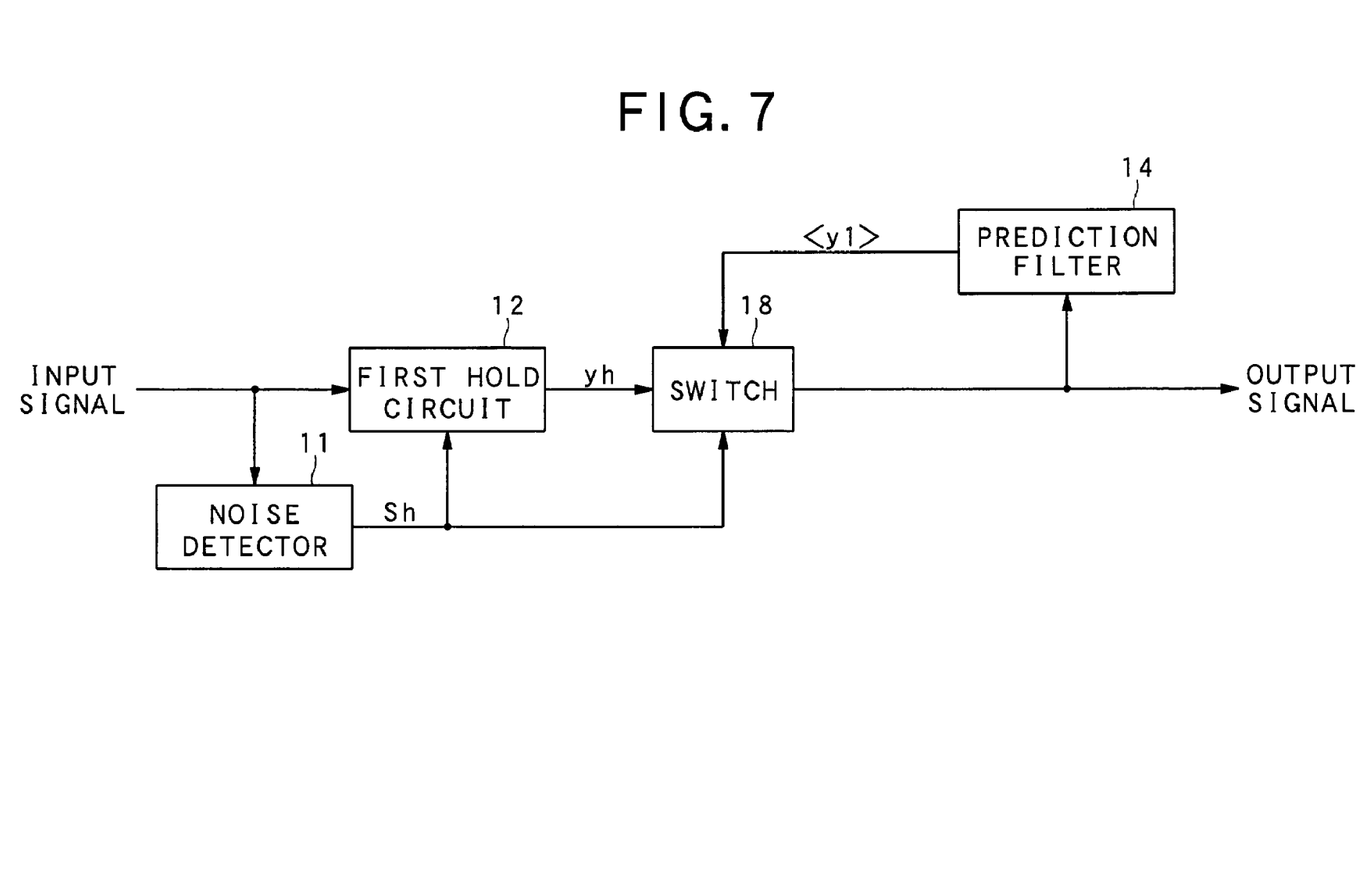
FIG. 7 is a block diagram showing a simplified configuration of a noise canceller according to a variation of the embodiment.

Next, a variation of the noise canceller shown in FIG. 1 will be described. FIG. 7 is a block diagram showing a simplified configuration of a variation of the noise canceller according to this embodiment. As shown in FIG. 7, this example is advantageous in that the configuration of the noise canceller can be simplified compared with that in FIG. 1.

The noise canceller shown in FIG. 7 comprises the noise detector 11 serving as a noise detecting device, the first hold circuit 12 serving as a first holding device, the prediction filter 14 serving as a prediction filter, and a switch 18 serving as a switching device. Of these components, the noise detector 11, first hold circuit 12, and prediction filter 14 operate and function in a manner similar to those in FIG. 1. However, the configuration in FIG. 7 does not include the adder 13, second hold circuit 15, subtractor 16, etc. shown in FIG. 1.

According to the configuration in FIG. 7, in relation to an input signal to the noise canceller, the noise detector 11 detects a noise component and outputs the hold signal Sh, and then the first hold circuit 12 outputs the sample value yh described above. Besides, the prediction filter 14 performs filter operations on outputs from the switch 18, determines predicted values <y1> one after another, and outputs them as a predicted signal. The switch 18 controls circuit connection by switching between the outputs of the first hold circuit 12 and the prediction filter 14 based on the hold signal Sh. The outputs from the switch 18 constitute the output signal of the noise canceller.

The switch 18 switches the circuit connection so as to pass the sample value yh from the first hold circuit 12 in normal times, and the predicted value <y1> from the prediction filter 14 when external noise is detected by the noise detector 11. As a result, that part of the signal waveform in FIG. 2 which exists during the time t when the sample value yh is held is replaced with the predicted signal. Consequently, the output signal generated contains the input signal of the noise canceller from which the components attributable to the external noise has been removed.

Thus, it can be seen that the variation shown in FIG. 7 functions as a noise canceller with a simpler configuration than that in FIG. 1. However, whereas in the case of FIG. 1, any prediction error component superimposed over the predicted value <y1> determined by the prediction filter 14 is cancelled by the second hold circuit 15 and subtractor 16, with the configuration in FIG. 7, any error component in the predicted value <y1> is superimposed over the output signal. Therefore, for more accurate operations, it is desirable to use the configuration in FIG. 1.

In both examples in FIGS. 1 and 7, the signal inputted in the prediction filter 14 is compensated for noise components. This makes it possible to reduce the effect of the noise components on the prediction made by the prediction filter 14.

In the embodiments described above, the noise canceller according to the present invention has been applied to an FM tuner, but the present invention is not limited to this. It can be widely applied to various apparatus configured to remove noise contained in input signals.

As described above, by making it possible to determine the duration of noise components of an input signal and to compensate for any lost portion of the input signal, the present invention can implement a noise canceller which can remove the noise components while keeping original signal components intact, and thereby maintain good signal quality.

Also, since the present invention comprises a plurality of delay elements cascaded together, uses a sampling frequency set at n times the frequency of a pilot signal and having a bandwidth two or more times that of a received signal, and predicts the current sample value based on output from m delay elements which correspond to integral multiples of the cycle of the pilot signal, prediction time can be made long even if a high sampling frequency is used. Also, the present invention can achieve high prediction accuracy around n times (n is a positive integer) the frequency of the pilot signal (e.g., 19 kHz).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application Nos. 2001-253354 and 2001-256588 filed on Aug. 23, 2001 and Aug. 27, 2001 including the specification, claims, drawings and summary is incorporated herein by reference in its entirety.

What is claimed is:

1. A noise canceller which removes a noise component included in an input signal, comprising:
   a noise detecting device which detects said noise component contained in said input signal and determines duration of said noise component;
   a first holding device which passes said input signal in normal times and holds said input signal during the duration of said noise component;
   a first holding device which passes said input signal in normal times and holds said input signal during the duration of said noise component;
   a compensating device which outputs said held input signal by adding a compensating signal to compensate for any portion lost during the duration of said noise component;
   a prediction filter which determines predicted values of said input signal one after another by performing operations on an output signal of said compensating device and outputs the predicted values as a predicted signal;
   a second holding device which holds said predicted signal and generates a predicted hold signal during the duration of said noise component; and
   a compensating signal generation device which generates said compensating signal by subtracting said predicted hold signal from said predicted signal.

2. The noise canceller according to claim 1, wherein said prediction filter comprises:
   a cascade of delay elements for holding a plurality of sample values sampled at a sampling frequency which is n times (n is an integer equal to or larger than 2) the frequency of a pilot signal contained in said input signal and has a bandwidth two or more times that of said input signal; and
   an arithmetic device which produces the predicted values of said input signal based on output from m delay elements (m is an integer equal to or larger than 2) out of said cascade of delay elements which correspond to integral multiples of the cycle of said pilot signal counting from the input of said prediction filter.

3. The noise canceller according to claim 1, wherein said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from one delay element out of said cascade of delay elements which corresponds to the cycle of said pilot signal counting from the input of said prediction filter.

4. The noise canceller according to claim 1, wherein said input signal is a received FM signal, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from m delay elements (m is an integer equal to or larger than 2) out of said cascade of delay elements which correspond to integral multiples of the cycle of said pilot signal counting from the input of said prediction filter.

5. The noise canceller according to claim 1, wherein said input signal is a received FM signal, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from one delay element out of said cascade of delay elements which corresponds to the cycle of said pilot signal counting from the input of said prediction filter.

6. The noise canceller according to claim 1, wherein said input signal is a received FM signal, a sampling frequency is set to 12 times the frequency of a pilot signal, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from m delay elements (m is an integer equal to or larger than 2) out of said cascade of delay elements which correspond to integral multiples of the cycle of said pilot signal counting from the input of said prediction filter.

7. The noise canceller according to claim 1, wherein said input signal is a received FM signal, a sampling frequency is set to 12 times the frequency of a pilot signal, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from one delay element out of said cascade of delay elements which corresponds to the cycle of said pilot signal counting from the input of said prediction filter.

8. The noise canceller according to claim 1, wherein said input signal is a received FM signal, said sampling frequency is set to 12 times the frequency of said pilot signal, and the current sample value is predicted based on output from the 12th and 24th delay elements of said prediction filter counting from the input of said prediction filter; and a prediction is made according to a predictive equation $y=ax+b$, where x denotes a past value, y denotes said current sample value, and a denotes a slope of a line described by the predictive equation, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from m delay elements (m is an integer equal to or larger than 2) out of said cascade of delay elements which correspond to integral multiples of the cycle of said pilot signal counting from the input of said prediction filter.

9. The noise canceller according to claim 1, wherein said input signal is a received FM signal, said sampling frequency is set to 12 times the frequency of said pilot signal, and the current sample value is predicted based on output from the 12th delay element of said prediction filter counting from the input of said prediction filter; and a prediction is made according to a predictive equation $y=x$, where x denotes a past value and y denotes said current sample value, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from one delay element out of said cascade of delay elements which corresponds to the cycle of said pilot signal counting from the input of said prediction filter.

10. A noise canceller which removes a noise component included in an input signal, comprising:

a noise detecting device which detects said noise component contained in said input signal and determines duration of said noise component;

a prediction filter which performs operations on sample values of said input signal, determines predicted values of said input signal one after another from the delayed sample values, and outputs the predicted values as a predicted signal; and a switching device which performs switching control so as to produce outputs by passing said input signal in normal times and passing said predicted signal during the duration of said noise component, wherein said input signal is a received FM signal, said sampling frequency is set to 12 times the frequency of said pilot signal, and the current sample value is predicted based on output from the 12th and 24th delay elements of said prediction filter counting from the input of said prediction filter; and a prediction is made according to a predictive equation y=ax+b, where x denotes a past value, y denotes said current sample value, and a denotes a slope of a line described by the predictive equation, and said prediction filter comprises:

a cascade of delay elements for holding a plurality of sample values sampled at a sampling frequency which is n times (n is an integer equal to or larger than 2) the frequency of a pilot signal contained in said input signal and has a bandwidth two or more times that of said input signal; and an arithmetic device which produces predicted values of said input signal based on output from m delay elements (m is an integer equal to or larger than 2) out of said cascade of delay elements which correspond to integral multiples of the cycle of said pilot signal counting from the input of said prediction filter.

11. A noise canceller which removes noise components included in a received signal, and comprises a prediction filter that obtains a plurality of sample values as a past value by sampling said received signal and predicts the current sample value based on at least one among said plurality of the sampling values, wherein said prediction filter comprises:

a cascade of delay elements for holding said plurality of sample values sampled at a sampling frequency which is n times (n is an integer equal to or larger than 2) the frequency of a pilot signal contained in said received signal and has a bandwidth two or more times that of said received signal; and an arithmetic device which produces said current sample value based on output from m delay elements (m is an integer equal to or larger than 2) out of said cascade of delay elements which correspond to integral multiples of the cycle of said pilot signal counting from the input of said prediction filter, wherein said received signal is a received FM signal, said sampling frequency is set to 12 times the frequency of said pilot signal, the current sample value is predicted based on output from the 12th and 24th delay elements of said prediction filter counting from the input of said prediction filter, and a prediction is made according to a predictive equation y=ax+b, where x denotes said past value, y denotes said current sample value, and a denotes a slope of a line described by the predictive equation.

* * * * *

UNITED STATES PATENT AND TRADEMARK OFFICE
CERTIFICATE OF CORRECTION

| | |
|---|---|
| PATENT NO. | : 7,103,122 B2 |
| APPLICATION NO. | : 10/200142 |
| DATED | : September 5, 2006 |
| INVENTOR(S) | : Suganuma |

Page 1 of 1

It is certified that error appears in the above-identified patent and that said Letters Patent is hereby corrected as shown below:

Col. 12, cancel lines 35-37, namely:

"a first holding device which passes said input signal in normal times and holds said input signal during the duration of said noise component;"

Signed and Sealed this

Sixth Day of March, 2007

JON W. DUDAS
*Director of the United States Patent and Trademark Office*